United States Patent [19]

Hodsdon

[11] Patent Number: 4,642,627
[45] Date of Patent: Feb. 10, 1987

[54] ILLUMINATED COMPACT CONTROL SURFACE

[75] Inventor: Roy F. Hodsdon, Lynchburg, Va.

[73] Assignee: General Electric Company, Lynchburg, Va.

[21] Appl. No.: 589,000

[22] Filed: Mar. 13, 1984

[51] Int. Cl.⁴ .............................................. G09G 3/18
[52] U.S. Cl. .................................... 340/765; 340/711; 340/712; 340/365 R; 455/90
[58] Field of Search .................. 340/711, 765, 365 R, 340/365 VL, 815.16, 818.17, 712

[56] References Cited

U.S. PATENT DOCUMENTS

| T936,004 | 7/1975 | Willis | 340/765 |
|---|---|---|---|
| 3,879,722 | 4/1975 | Knowlton | 340/712 |
| 3,959,610 | 5/1976 | Finnegan et al. | |
| 4,088,992 | 5/1978 | Kmetz et al. | 340/765 |
| 4,311,996 | 1/1982 | Nakamura et al. | 340/711 |
| 4,313,108 | 1/1982 | Yoshida | 340/712 |
| 4,315,258 | 2/1982 | McKnight et al. | 340/765 |
| 4,403,216 | 9/1983 | Yokoi | 340/784 |

OTHER PUBLICATIONS

FT290R Review, *Radio & Electronics World*, vol. 1 iss. 2, Nov. 1981, pp. 36-39.
CQ Magazine, "The Kenwood TR-2400" by John J. Schultz, Jan. 1981, pp. 26-29.

*Primary Examiner*—Gerald L. Brigance
*Attorney, Agent, or Firm*—Nixon & Vanderhye

[57] ABSTRACT

A control surface for controlling the operation of an electronic apparatus includes a liquid crystal display device and a keypad. The liquid crystal display device selectively changes its light transmittance in response to electrical signals produced by the electronic apparatus in order to provide a visual indication viewable by a human viewer. A light source emits light. A first optical coupler including a specular surface and a light transmissive diffuser is disposed a predetermined distance from the liquid crystal display device. Ambient light passing through the liquid crystal display device strikes the specular surface and is reflected back through the display device toward the human viewer, illuminating indicia displayed by the display device. Light from the light source strikes the light diffuser at a high angle of incidence and is scattered toward the display device, illuminating the display device. A display driver (which coverts electrical signals produced by the electronic apparatus to driving signals suitable for driving the liquid crystal display device) is electrically connected to the display device with elastomeric zebra connectors. The liquid crystal display device, the light diffuser, the specular surface, the elastomeric connectors and the display driver are all disposed in a clear, weatherproof plastic cover. An opaque keypad is provided to control the operation of the electronic apparatus. The clear cover and the keypad are disposed in a housing. An opening (into which a lens is secured) is provided in the housing in proximity with the light source to direct some of the light emitted by the light source to floodlight the keypad.

27 Claims, 4 Drawing Figures

ILLUMINATED COMPACT CONTROL SURFACE

CROSS-REFERENCES TO RELATED APPLICATIONS

This application is related to my copending application entitled "CONTROL SURFACE FOR A TRUNKING PERSONAL RADIO" Ser. No. 588,997 filed Mar. 13, 1984, (filed concurrently with the present application), the contents of which are incorporated herein by reference.

FIELD OF THE INVENTION

The invention generally relates to the packaging of electronic devices. More specifically, the present invention relates to an illuminated compact control surface for controlling the operation of an electronic device.

BACKGROUND OF THE INVENTION

As integrated circuit manufacturing technology has advanced, it has become possible to decrease the size of electronic devices. Great efforts have successfully been directed toward the miniaturization of many different types of electronic devices (e.g., telecommunications equipment). One of the limitations on the degree of miniaturization possible is the construction and design of the control surface (user interface). Suitable interface devices for enabling a user to interact with functionally highly complex, miniaturized electronic circuitry have become necessary. A suitable control interface must necessarily have a high control per unit area density if the overall size of the electronic device is to be minimized. The interface should suitably be capable of providing the user with appropriate information about operating parameters of the device and permitting the user to program a wide variety of control data into the electronic device.

It is often desirable that such a control interface be durable, shock-resistant, weather-resistant and highly reliable under a variety of adverse conditions in order to withstand rough treatment.

Matrix alpha-numeric keyboards are especially suited for high density control surfaces because they provide a very high control density per unit area and are useful for programming a variety of different types of information (such as numerals, strings of numerals, alphabetic symbols, strings of alphabetic symbols, and control symbols). The keys of such alpha-numeric keyboards typically are opaque. Each key typically bears one or more symbols designating its function or functions.

One of the disadvantages of alpha-numeric keyboards is that they may be difficult to operate under low ambient light conditions. At low light levels, the user may not be easily able to distinguish between the various keys, or to read the symbols imprinted on the keys. Western Electric Company, among others, has developed a TOUCH-TONE keypad providing backlighting of the keys for ease of operation under low ambient light conditions. The Western Electric Co. TRIMLINE ® model telephone set is equipped with such a keypad. Each of the keys of the keypad comprises translucent material (such as plastic). A lighting source is provided behind the keypad to backlight the keys, providing high contrast between the key and opaque symbols imprinted on each of the keys. Keys may be distinguished from one another, and the function of each key may be easily ascertained.

Unfortunately, while conventional TOUCH-TONE keypads provide versatility, high reliability and durability, they typically require a substantial mounting surface area. Likewise, the backlighting technique typically employed for such keypads limits the degree of miniaturization of the control surface (because of the extra volume behind the keypad occupied by the components providing backlighting). For this reason, past keypads have been unsuitable for extremely miniaturized electronic devices encased in housings having very small surface areas.

Another limitation on the miniaturization of electronic devices in the past has been the power and mounting area requirements of versatile display devices. Sophisticated miniaturized electronic devices often may generate information (such as, for example, user-entered data, various operating parameters, status of operation, etc.) the display of which may be useful to the user. Much of this information may not be indicated by simple on/off indicators (historically the type of visual indicators requiring the smallest mounting area). Light Emitting Diode seven-segment digital displays have been developed that required only a small mounting area, and yet can display a wide variety of alpha-numeric information. Such LED displays, however, consume relatively large amounts of power (typically 10–40 mW/digit); thus, the decrease in the surface area of the control surface made possible by the use of an LED digital display device is often counteracted by the added volume necessary to accommodate the associated power supply requirements of the display device.

There has been an increasing growth in the use of liquid crystal displays, which provide alpha-numeric readouts with very low power consumption (on the order of 150 $\mu$W for a seven segment, 10-mm digit). As is well known, a liquid crystal display provides a visual indication by selectively changing its light transmissivity (rather than by actually producing light). A reflecting surface provided behind a liquid crystal display typically reflects enough ambient light to provide illumination of the displayed indication. Under low ambient light conditions, however, a source of light must be provided in order to make the indication visible.

A liquid crystal display is typically mounted on a substantially flat control surface. Due to the properties of typical liquid crystal displays, the angle of view is often limited to only 45° from normal, requiring that illuminating light strike the display at an angle close to normal to the face of the display. For this reason, liquid crystal displays are typically backlighted if they are to be used under low ambient light conditions. Often, backlighting is accomplished by positioning a half-silvered mirror behind the display. The mirror acts as a reflector for ambient light and as a partially transmissive medium for a light source positioned behind the mirror. This technique produces a contrast in the indication which is not as good as can be obtained from either a purely transmissive or a reflective system, although the comprise is adequate for some purposes. See Sherr, Sol, Electronics Displays at page 498 (John Wiley & Sons, Inc., 1979).

A further disadvantage of this backlighting technique is that space must be provided behind the liquid crystal display for a light source. A separate light source is typically used solely for backlighting the liquid crystal display. Where space is at a premium, it is often undesirable and difficult to position a light source behind the liquid crystal display. A light source positioned behind the display may interfere with the electrical connections between the display and its driving circuit, and the light source may be difficult to replace when it fails. The present invention provides a backlighted display and an illuminated keypad requiring only very small surface mounting area and having none of the above disadvantages.

BRIEF SUMMARY OF THE INVENTION

A control surface for controlling the operation of electronic circuits of an electronic apparatus includes a liquid crystal display device responsive to electrical signals produced by the electronic circuits for providing a visual indication viewable by a human viewer. The control surface may further include a keypad connected to the electronic circuits for controlling the operation of the circuits. The liquid crystal display selectively changes its light transmittance according to the electrical signals to which it is responsive. A light source emits light. A first optical coupler couples some of the light emitted by the light source through the liquid crystal display and toward a human viewer. A second optical coupler may direct another portion of the light emitted by the light source onto the keypad to illuminate the keypad.

The liquid crystal display typically includes a liquid crystal for selectively changing light transmittance, a first light transmitting plate for transmitting light into the liquid crystal, and a second light transmitting plate for transmitting light out of the liquid crystal toward the human viewer. The first optical coupler directs light onto the first light transmitting plate. The first light transmitting plate may be polarized to pass only light of a first predetermined polarity, while the second light transmitting plate may be polarized to pass only light of a second predetermined polarity, the first and second polarities being orthogonal to one another.

The first optical coupler may include a reflector for reflecting light produced by the light source toward the first light transmitting plate of the liquid crystal display. This reflector may include a flat reflective surface and-/or a light diffuser. The light diffuser scatters light produced by the light source toward the liquid crystal display. The flat reflective surface may be used not only to reflect light from the light source through the liquid crystal display, but may also reflect back toward the liquid crystal display ambient light which has been transmitted through the liquid crystal display toward the reflective surface. The light from the light source may strike the light diffuser at a high angle of incidence.

The control surface may also include a housing for housing the liquid crystal display, the light source and the first optical coupler. The housing may include a first wall in proximity with the light source which defines an opening. The second optical coupler may comprise a lens disposed in the opening for directing light from the light source onto the keypad.

The keypad may include a sheet of non-conductive, resilient material disposed on a first surface of a printed circuit board. This sheet of non-conductive material may define a plurality of resilient, depressible hollow molded protrusions. An electrical contact (which may comprise a circular conductive carbon silicone pad) may be fixedly disposed within each hollow associated with each protrusion. The electrical contact connects predetermined ones of electrical pathways on the printed circuit board when its associated protrusion is depressed. There may be sixteen such protrusions (each of which comprise a key), each of which may have a visible symbol imprinted upon it.

The control surface may also include a display driver, electrically connected to the electronic circuits of the electronic apparatus, for converting the electrical signals produced by the circuits to electrical driving signals suitable for driving the liquid crystal display. The liquid crystal display may include a plurality of electrical connectors disposed on a surface of the first light transmitting plate for electrically connecting the display with the display driver. The display driver may be electrically connected to the liquid crystal display by elastomeric zebra connectors. A transparent plastic cover may house the display, the display driver, the first optical coupler and the zebra connectors.

In accordance with the present invention, a single light source may be used to both backlight the liquid crystal display and floodlight the keypad. A reliable electrical interconnect is provided between the liquid crystal display and the display driver. A plastic cover provides environmental protection and a mounting surface for an LED battery light indicator and at the same time retains and locates the liquid crystal display and its associated first optical coupler and display driver. The light source need not be located behind the liquid crystal display device, this providing easy access to the light source in addition to avoiding the other disadvantages of positioning a light source behind the display discussed previously.

BRIEF DESCRIPTION OF THE DRAWINGS

These and other objects and advantages of the invention will become more apparent and more readily appreciated from the following detailed description of the presently preferred exemplary embodiment of the invention, taken in conjunction with the accompanying drawings, of which.

DETAILED DESCRIPTION OF THE PREFERRED EMBODIMENTS

Figure 1:
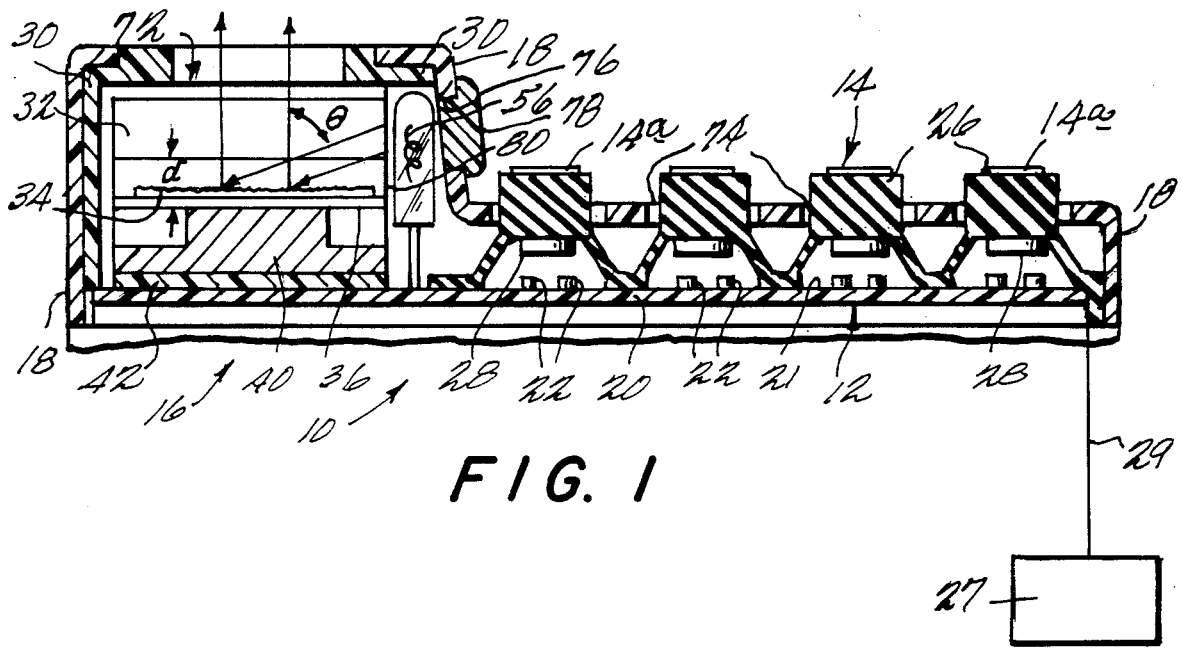
FIG. 1 is a side elevational view in cross-section of a presently preferred exemplary embodiment of a control surface in accordance with the present invention.
Figure 2:
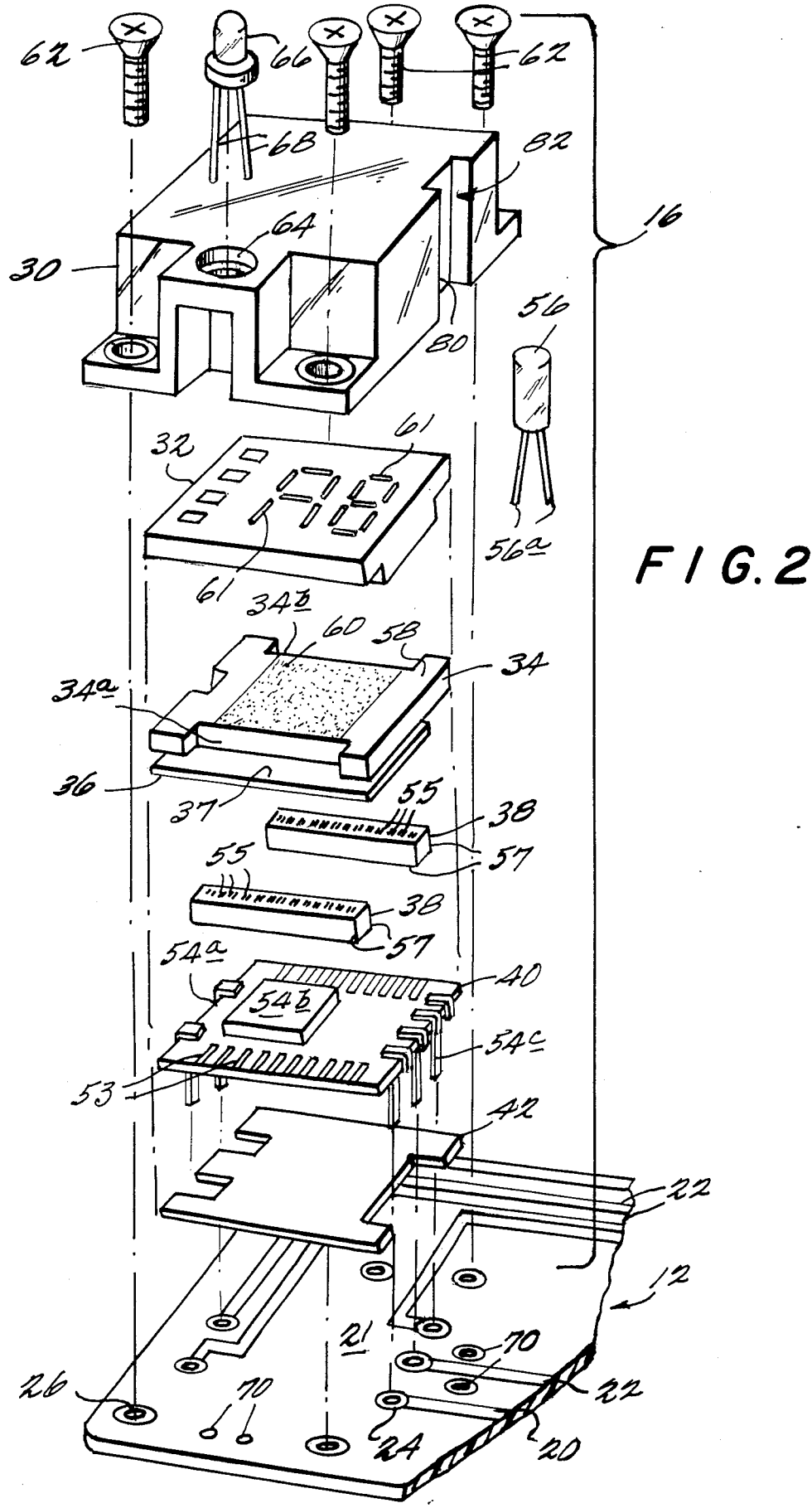
FIG. 2 is an exploded perspective view of the display assembly of the embodiment shown in FIG. 1.

FIGS. 1 and 2 show a presently preferred exemplary embodiment of a control surface 10 in accordance with the present invention. Control surface 10 comprises a printed circuit board 12, a keypad 14, a liquid crystal display (LCD) assembly 16 and a housing 18. Printed circuit (PC) board 12 comprises a rigid sheet 20 of electrically insulative material (such a laminated epoxy fiberglass) adhering to at least one surface 21 of which are a plurality of electrically conductive pathways 22 (comprising, for instance, a conductive material such as copper). Printed circuit board 12 also may include plated-through holes 24 for electrically and mechanically connecting (e.g., by soldering) with the leads of a variety of components, and non-plated holes 26 (drilled through sheet 20) used for mechanical mounting purposes. PC board 12 is connected to the electronic circuits of an electrical apparatus 27 to be controlled (suitably through a flexible printed circuit 29). Apparatus 27 may be any electronic device for which a miniature control surface is required, such as a personal radio transceiver. PC board 12 routes electrical signals produced by control surface 10 and electrical signals produced by electronic apparatus 27.

In FIG. 1, keypad 14 is shown disposed on surface 21 of sheet 20 of PC board 12. Keypad 14 comprises a sheet of molded charcoal-grey silicone rubber. Hollow protrusions 26 (suitably substantially square in shape and sixteen in number) are molded into keypad 14, and form the keys of the keypad. A unique number or symbol 14a (such as numerals 0-9, alphabetic letters, or special symbols) is imprinted on each of the protrusions 26 of keypad 14 in indelible white writing. Each of keys 26 is dedicated to one or more predetermined unique functions to enable a user to control the functions of electronic apparatus 27.

Because of the high resiliency of the silicone rubber composition of keypad 14, keys 26 deform when depressed and resume their original shape when released. A circular conductive carbon silicone pad 28 is molded into the keypad within the hollow defined by each of keys 26. Keypad 14 is disposed on surface 21 of PC board 12 such that each of carbon pads 28 is in registration with at least two of conductive pathways 22. When one of keys 26 is depressed, the carbon pad 28 disposed within that key electrically contacts the ones of pathways 22 in registration with the pad. Because carbon pad 28 is itself conductive, an electric current flows between the contacted ones of pathways 22, completing an electrical circuit. The resulting electric current travels to the electronic apparatus 27 (through flexible printed circuit 29), where it is detected and used to control the functions of the apparatus.

When key 26 is released, the resilience of the silicone rubber composition of keypad 14 causes carbon pad 28 to spring back away from pathways 22, breaking the electrical circuit which was formed when the key was depressed. Other keys 26 may be depressed to further program electronic apparatus 27.

The thickness of the silicone rubber composition of keypad 14 and the dimensions of each of keys 26 are selected to provide sufficient resistance to the depressing of keys by a user to provide positive tactile sensations when carbon pad 28 electrically connects with pathways 22, to reduce "bouncing" of the pad when it strikes the pathways, and to provide durability and puncture-resistance of the keys.

Liquid crystal display assembly 16 provides a visual indication to the user of various parameters of operation of the electronic device. For instance, liquid crystal display assembly 16 may be used to facilitate programming of electronic apparatus 27 by displaying the symbols associated with keys 26 of keypad 14 as those keys are depressed. Other information may, of course, be displayed by liquid crystal display assembly 16 (such as, for example, selected or predetermined ones of the operating parameters of electronic apparatus 27).

As shown in FIGS. 1 and 2, liquid crystal display assembly 16 includes a transparent cover 30, a liquid crystal display device 32, a light diffuser 34, a reflector 36, connectors 38, a display driver module 40 and a non-conductive spacer 42.

Figure 3:
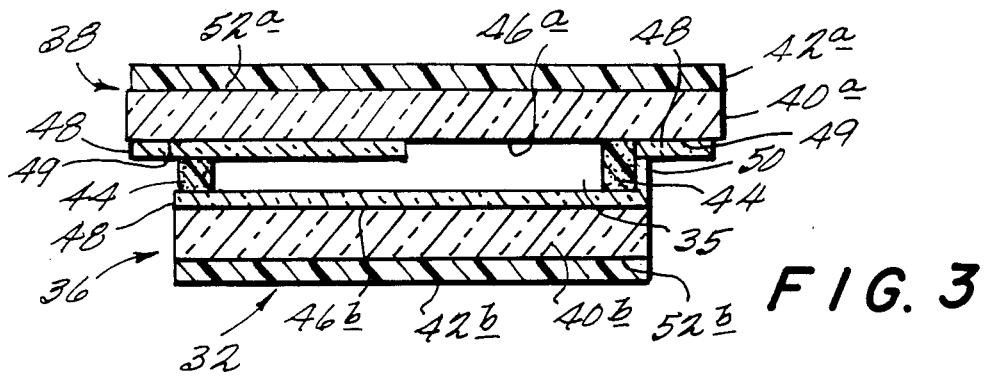
FIG. 3 is a side elevational view in cross-section of the liquid crystal display device shown in FIG. 1.

A detailed side elevational view in cross-section of liquid crystal display device 32 is shown in FIG. 3. LCD device 32 includes a liquid crystal 35 encased between two plates 36 and 38. Each of plates 36 and 38 is light transmissive. Liquid crystal 35 is a mesophase material (i.e., it has an intermediate phase between the solid and the isotropic liquid phase). Liquid crystal 35 is comprised of elongated organic molecules that arrange themselves into the nematic order, as is well known. Briefly, liquid crystal 35 normally rotates the direction of polarization of polarized light passing through it by 90°. However, when liquid crystal 35 is excited by an electric field of predetermined direction, the molecules of the liquid crystal realign, causing polarized light to be transmitted through the liquid crystal without rotation in the direction of polarization.

Plate 38 includes a plate of transparent glass 40a and a polarizing film 42a. Likewise, plate 36 includes a plate of transparent glass 40b and a polarizing film 42b. Plates of glass 40a and 40b are bonded to one another by a non-conductive adhesive 44. A surface 46a of plate 40a and a surface 46b of plate 40b contact liquid crystal 34. An optically-transparent conductive coating layer 48 is disposed on at least part of the areas of surfaces 46a and 46b. Typically, plate 40a has a greater area than plate 40b so that areas 49 of surface 46a overhang plate 40b. The conductive coating 48 disposed on plate 40a is disposed on at least part of areas 49 of overhang. A conductive spacer 50 (typically an extension of conductive coating layer 48) connects conductive coating 48 disposed on surface 46b to conductive coating 48 disposed on surface 46a.

Typically, conductive coating 48 will be disposed on the entire surface 46b of plate 40b, while the conductive coating will be disposed only on selected, respective areas of surface 46a of plate 40a. Conductive coating layer 48 is disposed on plate 40a in segments 61 (as shown in FIG. 2) patterned according to the shape of visual indicia desired to be displayed (such as two seven-segment digits, sixteen segment starburst patterns, etc.). Respective pathways of conductive coating 48 disposed on surface 46a may be used to selectively apply electric current to respective segments 61 of the pattern.

Light polarizing film 42a passes only light of a first predetermined polarity. A light polarizing film 42b likewise only passes light of a first predetermined polarity. Polarizing film 42a is adhered to a surface 52a of plate 40a, while polarizing film 42b is adhered to a surface 52b of plate 40b. Films 42a and 42b are oriented on surfaces 52a and 52b, respectively, such that the polarity of light passed by film 42a is orthogonal to the polarity of light passed by film 42b. If no electric current is applied to conductive coating 48, light transmitted through liquid crystal display device 32 will be polarized to a first direction of polarization by, for instance, polarizing film 42a. This polarized light will undergo a 90° shift in phase when passing through liquid crystal 35, and will thus be of the proper polarity to pass through polarizing film 42b. Liquid crystal display device 32 will be light transmissive when not electrically excited (i.e., it will appear to be substantially transparent).

When an electric current is applied between the coating 48 disposed on surface 46a and the coating 48 disposed on surface 46b, the molecules of liquid crystal 34 will be realigned such that no shift in the direction of polarization of polarized light transmitted through the liquid crystal occurs. Light transmitted through, for example, polarizing film 42a will have a polarity orthogonal to that which may be transmitted by polarizing film 42b when it strikes film 42b, and thus will not pass through liquid crystal display device 32. In this way, quantities of liquid crystal 35 in proximity with excited segments 61 of coating 48 wll appear to be opaque, while quantities of the liquid crystal in contact with segments 61 of coating 48 not so electrically excited will appear to be transparent.

Figure 4:
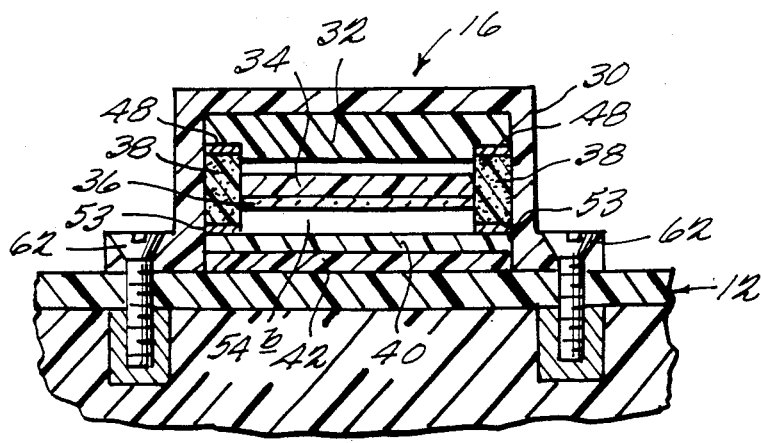
FIG. 4 is a side elevational end view in cross-section of the display assembly of the embodiment shown in FIG. 1 showing the electrical connection between the liquid crystal display device and the display driver.

As is shown in FIGS. 2 and 4, conductive coating 48 of liquid crystal display device 32 disposed on surface 49 of plate 40a are connected to electrodes 53 of display driver 40 through elastomeric zebra connectors 38. Connectors 38 comprise flexible respective conductors 55 disposed between two thin sheets 57 of resilient, non-conductive elastomeric material. Connectors 38 provide an impact-resistant, deformable electrical connection between liquid crystal display device 32 and display driver 40.

Display driver 40 is soldered to plated-through holes 24 of PC board 12. Display driver 40 conventionally converts logic level signals conducted by pathways 22 of printed circuit board 12 to alternating-current driving signals suitable for connecting to conductive coating 48 of display 32 (the use of alternating current driving signals increases the life of the display). Display drivers 40 may also conventionally encode the signals conducted by pathways 22 to excite appropriate ones of the segments 61 of liquid crystal display device 32. Display driver 40 is conventional in design, and may include a ceramic thick film substrate 54a, a prepackaged display driver integrated circuit 54b, and conventional conductive lugs 54c. Spacer 42 (comprising an insulative material such as plastic) prevents electric currents flowing on display driver 40 from being electrically coupled to PC board 12.

As will be understood from the previous discussion, liquid crystal display device 32 produces no light on its own; rather, its transmissivity is altered in accordance with the indication being displayed. In order to make the indication displayed by liquid crystal display device 32 visible, it is necessary to transmit light through the display device toward the user.

In FIGS. 1 and 2, a substantially flat reflector plate 36 is shown disposed parallel to plate 36 of display device 32 to reflect light toward polarizing film 42b. Reflector plate 36 includes a specular surface 37 having high reflectivity, and preferably comprises electrically non-conductive material. Ambient light (such as, for example, room light or natural outside light) may pass through transparent portions of LCD device 32, and be reflected by reflector plate 36 back through the LCD device toward a user. Those portions of liquid crystal 34 which are non-transmissive (due to electrical excitation) will block the path of the reflected light, permitting the user to see the indication being displayed.

Under low ambient light conditions, insufficient light may be reflected by reflector plate 36 to permit a view to see the indication displayed by LCD device 32. An electrical light source 56 (which may comprise, for example, an incandescent lamp) is mounted on PC board 12 a predetermined distance from an edge 80 of cover 30. Source 56 is typically mounted to PC board 12 by inserting leads 56a into sockets 70, which in turn are soldered to plated-through holes 24 of the PC board. Current flowing through pathways 22 provide light source 56 with power. A light diffuser 34 is disposed on reflective surface 37 of reflector plate 36, and is fixed a predetermined distance d from and in parallel with plate 36 of liquid crystal display device 32. Light diffuser 34 defines two indentations 34a and 34b into which connectors 38 are disposed. Light diffuser 34 may comprise a molded sheet of acrylic plastic having molded upon a surface 58 a region 60 of irregular texture (e.g., random modulations or roughness, corrugations, parallel grooves, etc.).

Light source 56 is located a lateral distance away from the display device. Region 60 scatters light rays produced by light source 56 toward display device 32 at relatively low angles of incidence to the display (i.e., approximately normal to plate 40b). Region 60 may diffract or scatter (diffusely reflect) light rays emitted by light source 56 striking the region at high angles of incidence, thus providing relatively even illumination of LCD device 32. Light diffuser 34 is transparent and the texture of region 60 is not so irregular as to greatly interfere with light striking the diffuser at a low angle of incidence. in this way, ambient light passing through LCD device 32 will pass through light diffuser 34 and be reflected by reflector plate 36 back toward display device 32 without being greatly interfered with by the light diffuser.

LCD device 32, light diffuser 34, reflector plate 36, connectors 38, display driver 40 and plastic spacer 42 are all disposed and captivated within a cover 30. Cover 30 in conjunction with the contact pressure between display driver 40 and light diffuser 34 holds connectors 38 in correct alignment. Cover 30 may be mechanically fixed to holes 26 in PC board 12 by screws 62. Cover 30 defines a groove 82 to accommodate light source 56. Cover 30 may further define a cylindrical hole 64 into which is inserted a light emitting diode (LED) 66 (which is typically used to indicate the condition of the battery (not shown) of electronic apparatus 27). Cover 30 thus not only retains and locates display assembly 16 in position, but also provides environmental protection and a mounting surface for LED 66. LED 66 is electrically connected to PC board 12 by inserting its leads 68 into sockets 70 of the PC board.

A housing 18 is disposed on LCD display assembly 16 and keypad 14. Housing 18 comprises a molded impact-resistant plastic structure defining a rectangular opening 72 through which light may pass into and out of LCD device 32. Housing 18 also defines a plurality of openings 74 through which keys 26 protrude. Housing 18 further defines a roughly rectangular opening 76 in proximity with light source 56. A lens 78 (typically comprising molded translucent acrylic plastic) is secured into opening 78 (typically with epoxy cement) to concentrate and direct some of the light produced by light source 56 toward keys 26. Keys 26 are thus floodlighted, permitting a user to distinguish one key from another and to read the symbols imprinted upon each key.

Although this invention has been explained with reference to only a few exemplary embodiments, those skilled in the art will appreciate that many modifications of these exemplary embodiments are possible without departing from the novel and advantageous features of this invention as defined in the attached claims.

What is claimed is:

1. A top-mounted control surface for a personal radio transceiver of the type including electrical circuits for establishing communications with a further physically-distinct communications device, said control surface including:

light source means, electrically coupled to said electrical circuits, for emitting light in response to an electrical signal applied thereto;

liquid crystal display means, electrically coupled to said electrical circuits and mounted on a top surface of said transceiver, for selectively changing light transmittance in response to electrical signals applied thereto;

a reflecting assembly mounted substantially parallel to the display means, said assembly including means defining a reflective surface, and a layer of transparent material disposed on said reflective surface between said reflective surface and said display means, said layer defining an irregular surface opposing said display means and spaced a predetermined distance therefrom;

keypad means, electrically connected to said electrical circuits, for controlling the operation of said electrical circuits in response to manipulation by a human operator, said keypad means at least in part defining said transceiver top surface;

said light source means directing a first portion of the light produced thereby into the space between said display means and said irregular surface to strike said irregular surface at a high angle of incidence; and said light source means directing a second portion of the light produced by said light source means toward said keypad means to illuminate said keypad means.

2. A control surface as in claim 1 wherein said liquid crystal display means further includes:

first light transmissive plate means for transmitting light, said first light transmissive plate means defining a first surface;

second light transmissive plate means for transmitting light, said second light transmissive plate means defining a second surface;

liquid crystal means, disposed between said first and second light transmissive plate means and responsive to said electric signals, for transmitting light and for rotating the direction of polarization of said light transmitted through selected areas of said liquid crystal display means by 90°;

first light polarizing means, disposed on said first surface, for polarizing said transmitted light to a first predetermined direction of polarization; and second light polarizing means, disposed on said second surface, for transmitting light polarized to a second predetermined direction of polarization, said second predetermined direction rotated 90° from said first predetermined direction.

3. A control surface as in claim 2 wherein said control surface further includes display driver means, electrically connected to said electrical circuits, for converting said electrical signals to electrical driving signals driving said liquid crystal display means; and means for electrically connecting said liquid crystal display means with said display driver means.

4. A control surface as in claim 3 wherein said connecting means includes a resilient elastomeric strip disposed between said display means and said display driver means.

5. A control surface as in claim 4 wherein said liquid crystal display means further includes an optically transmissive conductive coating, disposed on a second surface of said first light transmissive plate means and on a second surface of said second light transmissive plate means, said resilient connecting strip contacting said conductive coating, said conductive coating also defining a plurality of respective segments on said second surface of said second light transmitting means, said segments defining a predetermined pattern, said conductive coating disposed on a substantial area of the second surface of said first light transmitting means, said conductive coating conducting said electrical driving signals to produce an electric field incident to said liquid crystal means, said liquid crystal means rotating the direction of polarization of said transmitted light where said electric field is present.

6. A control surface as in claim 5 wherein:

said predetermined pattern comprises two sets of seven respective segments, said segments of each said set defining the shape of the number 8; and wherein said conductive coating also defines a plurality of pathways, each of said pathways electrically isolated from others of said pathways, each of said segments electrically connected to a different one of said pathways, said resilient strip connecting said pathways to said display driver means.

7. A control surface as in claim 4 wherein said resilient strip includes:

first and second strips of elastomeric material; and a plurality of discrete electrical conductive elements disposed between said first and second strips.

8. A control surface as in claim 2 wherein said reflecting assembly scatters light produced by said light source means and striking said irregular surface at a high angle of incidence toward said first light transmissive plate means and specularly reflects toward said first light transmissive plate means ambient light incident to said first surface of said second light transmissive plate means and transmitted through said liquid crystal display means and striking said reflective surface at a low angle of incidence.

9. A control surface as in claim 1 wherein:

said control surface further includes housing means for housing said liquid crystal display means, said light source means and said first optical coupling means, said housing means including a first wall in proximity with said light source means, said first wall defining a first opening; and said second optical coupling means comprises lens means, disposed in said first opening, for directing said second portion of said light toward said keypad means.

10. A control surface as in claim 9 wherein:

said control surface further comprises a printed circuit board a plurality of electrical pathways on a first surface thereof, said electrical pathways conducting a plurality of respective ones of said electrical signals; and said keypad means is disposed on said printed circuit board, said keypad means including:

a sheet of non-conductive, resilient material disposed on said first surface of said printed circuit board;

means for defining a plurality of resilient, depressible molded hollow protrusion in said sheet, each of said protrusions defining a corresponding hollow; and plural electrical contact means, one of said contact means fixedly disposed within each of said hollows, for electrically connecting together predetermined ones of said electrical pathways when an associated one of said protrusions is depressed.

11. A control surface as in claim 10 wherein each of said electrical contact means comprises a circular conductive carbon silicone pad.

12. A control surface as in claim 10 wherein said sheet comprises molded silicone rubber.

13. A control surface as in claim 10 wherein said protrusion defining means defines sixteen of said protrusions, each of said protrusions including means for defining a visible symbol.

14. A control surface as in claim 1 wherein said light source means comprises a single lamp.

15. A control surface as in claim 4 further comprising light transmissive cover means for aligning and captivating said light source means, liquid crystal display means, first optical coupling means, display driver means and resilient elastomeric strip.

16. A display for displaying indicia pertaining to the operation of a personal radio transceiver, said transceiver of the type including (a) a case comprising an elongated box having a top surface, a bottom surface and plural side surfaces, the length of at least one edge of each of said side surfaces exceeding the length of any of the edges of said top and said bottom surfaces, and (b) electronic circuit means, disposed within said case, for establishing communications with a further physically-distinct communications device, said display including:
 light source means mounted to said case top surface for emitting light;
 liquid crystal display means, having a viewing surface defining a portion of said top surface, said display means mounted to said case in a position displaced laterally from the position of said light source means and electrically connected to said electronic circuit means, for selectively changing light transmissivity in response to electrical signals applied thereto, said display means defining a further surface parallel to and opposing said viewing surface; and
 light diffusing means, disposed on said case top surface and spaced a predetermined distance from said liquid crystal display means further surface, for receiving light emitted by said light source means at a high angle of incidence and for scattering said received light toward said liquid crystal display means in a direction substantially normal to said display means further surface.

17. An apparatus as in claim 16 wherein said liquid crystal display means further includes:
 first light transmissive plate means for transmitting light, said first light transmissive plate means defining said viewing surface;
 second light transmissive plate means for transmitting light, said second light transmissive plate means defining said further surface;
 liquid crystal means, disposed between said first and second light transmissive plate means and responsive to said electric signals, for transmitting light and for rotating the direction of polarization of said light transmitted through selected areas of said liquid crystal display means by 90°;
 first light polarizing means, disposed on said viewing surface, for polarizing said transmitted light to a first predetermined direction of polarization; and
 second light polarizing means, disposed on said further surface, for transmitting light polarized to a second predetermined direction of polarization, said second predetermined direction rotated 90° from said first predetermined direction.

18. An apparatus as in claim 17 wherein
 said apparatus further includes display driver means, electrically connected to said electronic circuit means, for converting said electrical signals to electrical display driving signals; and
 connecting means connected to said display drive means and said display means for applying said display driving signals to said display means and for spacing said display means said predetermined distance from said light diffusing means.

19. An apparatus as in claim 18 wherein said connecting means includes at least one resilient elastomeric zebra strip.

20. An apparatus as in claim 19 wherein said liquid crystal display means includes an optically transmissive conductive coating, disposed on a second surface of said first light transmissive plate means and on a second surface of said second light transmissive plate means, said conductive coating defining a plurality of respective segments on said second surface of said second light transmitting means, said segments defining a predetermined pattern, said conductive coating also disposed on a substantial area of the second surface of said first light transmitting means, said conductive coating conducting said electrical driving signals to produce an electric field incident to said liquid crystal means, said liquid crystal means rotating the direction of polarization of said transmitted light except where said electric field is not present.

21. An apparatus as in claim 20 wherein:
 said predetermined pattern comprises two sets of seven respective segments, said segments of each said set defining the shape of the number 8; and
 wherein said conductive coating a plurality of pathways, each of said pathways electrically isolated from others of said pathways, each of said segments electrically connected to a different one of said pathways, said connecting means connecting said pathways to said display driver means.

22. An apparatus as in claim 20 wherein said light diffusing means includes means for defining an irregular surface a predetermined distance from said liquid crystal display means.

23. An apparatus as in claim 22 wherein:
 said light diffusing means comprises a third light transmissive plate, said irregular surface disposed on said third plate; and
 said apparatus further comprises reflecting means, disposed on a second surface of said third plate, said second surface being substantially parallel to said irregular surface, for reflecting toward said first light transmissive plate means ambient light incident to said first surface of second light transmissive plate means and transmitted through said liquid crystal display means.

24. An apparatus as in claim 19 further comprising light transmissive cover means, for aligning and captivating said light source means, liquid crystal display means, display driver means and resilient strips.

25. In a personal communications device of the type including (a) a case comprising an elongated box having a top surface, a bottom surface and plural side surfaces, the length of at least one edge of each of said side surfaces exceeding the length of any of the edges of said top and said bottom surfaces and (b) electronic circuit means, disposed within said case, for establishing communications with a further physically-distinct communications device in accordance with control signals supplied thereto, an improvement comprising control surface means, disposed on said top surface and electrically coupled to said circuit means, for applying said control signals to said circuit means in response to manipulation thereof by a user, said control surface means including:
- a printed circuit board mounted to said case and including a plurality of electrical pathway means, electrically connected with said electronic circuit means and disposed on at least a first surface of said printed circuit board, for carrying electrical signals;
- a keypad including a sheet of non-conductive, resilient material encasing at least a portion of said printed circuit board first surface and defining a portion of said communications device top surface, said sheet defining a plurality of resilient, depressible molded hollow protrusions, each of said protrusions defining a corresponding hollow;
- plural electrical contact means, one fixedly disposed within each of said hollows, for electrically connecting predetermined ones of said electrical pathway means together when an associated one of said protrusions is depressed;
- liquid crystal display means electrically coupled to said printed circuit board pathway means and defining a further portion of said communications device top surface for selectively changing light transmissivity in response to electrical signals applied thereto;
- a reflective surface disposed on said printed circuit board first surface;
- a transparent plate having a surface disposed on said reflective surface, said transparent plate having a further, irregular surface;
- means disposed on said printed circuit board for electrically connecting said electrical pathway means to said liquid crystal display means and for spacing said liquid crystal display means a predetermined distance from and opposing said transparent plate irregular surface; and
- light source means, electrically connected to said printed circuit board pathway means and mounted on said printed circuit board first surface, for directing light toward said keypad and also toward said transparent plate irregular surface at high angles of incidence.

26. A personal radio communications device comprising:
- a hollow rectangular case including first and third side walls parallel to one another, second and fourth side walls parallel to one another, said first wall being rigidly joined to said second and fourth walls, said third wall being rigidly joined to said second and fourth walls, a bottom wall joined at a bottom end of said case to each of said first through fourth side walls, edges of each said first through fourth side walls together defining a substantially rectangular opening at a top end of said case opposite said bottom end thereof;
- electronic circuit means disposed in said hollow case for establishing communications with a remotely-located communications device;
- a keypad assembly electrically coupled to said electronic circuit means, said keypad assembly including:
  - a printed circuit board, mounted to said case top end obstructing said rectangular opening, including means defining a plurality of electrical pathways on a first surface thereof, and
  - a sheet of flexible material, disposed on said printed circuit board first surface, said sheet including means defining an array of keys, each of said keys including conductor means for selectively connecting predetermined ones of said pathways together;
- a display driving integrated circuit, disposed on said printed circuit board first surface and electrically coupled to pathways disposed on said printed circuit board first surface, for producing electrical display driving signals;
- a reflective surface disposed on said display driving circuit;
- a layer of transparent material having a surface disposed on said reflective surface, said layer defining a further, irregular surface;
- a liquid crystal display;
- connecting means, disposed between said printed circuit board first surface and said liquid crystal display and electrically coupled to said display driving circuit, for supporting said display a predetermined distance above and substantially opposing said irregular surface and for applying said electrical display driving signals to said display; and
- light source means, mounted to said printed circuit board, for producing light and for directing said light into the space between said display and said irregular surface, said directed light striking said irregular surface at a high angle of incidence and scattering toward said display.

27. A device as in claim 26 further including a lens disposed on said case top end in proximity to said light source for directing a portion of the light produced by said light source means toward said sheet of flexible material.

* * * * *